United States Patent [19]

Petri

[11] Patent Number: 4,525,904

[45] Date of Patent: Jul. 2, 1985

[54] RF GASKET RETAINER CLIP

[75] Inventor: Hector D. Petri, Framingham, Mass.

[73] Assignee: Illinois Tool Works Inc., Chicago, Ill.

[21] Appl. No.: 582,194

[22] Filed: Feb. 21, 1984

[51] Int. Cl.³ .............................................. F16L 3/08
[52] U.S. Cl. ...................................... 24/458; 24/297; 248/73; 411/508
[58] Field of Search .................. 24/297, 305, 336, 532, 24/533, 457, 458, 453; 248/67.5, 67.7, 71, 73; 411/508

[56] References Cited

U.S. PATENT DOCUMENTS

| | | | |
|---|---|---|---|
| 3,803,670 | 4/1974 | Johnson | 411/508 |
| 4,094,483 | 6/1978 | Busch | 248/73 |
| 4,356,987 | 11/1982 | Schmid | 248/73 |

FOREIGN PATENT DOCUMENTS 2453844 5/1976 Fed. Rep. of Germany ........ 248/73

*Primary Examiner*—William E. Lyddane
*Assistant Examiner*—Laurie K. Cranmer
*Attorney, Agent, or Firm*—J. P. O'Brien; T. W. Buckman

[57] ABSTRACT

A one-piece, snap-in fastener is provided for securing an elongate compressible gasket of given cross-sectional configuration to a panel having an elongate aperture into which the snap-in fastener is secured. The snap-in fastener comprises a bight portion, a pair of resilient leg portions integrally joining the bight portion and normally extending outwardly therefrom in substantially parallel, spaced apart relation. Each leg portion terminates with an inwardly extending foot portion. The bight portion, leg portions and feet portions lie in a common straight plane. A pair of resilient wing portions are integrally formed at the end of the feet portions and diverge from opposite sides of the common straight plane. The leg portions are spaced apart a distance to span the elongate aperture and are shaped to conform to the ends of the aperture in the region adjacent to the bight portion.

10 Claims, 8 Drawing Figures

U.S. Patent  Jul. 2, 1985  4,525,904
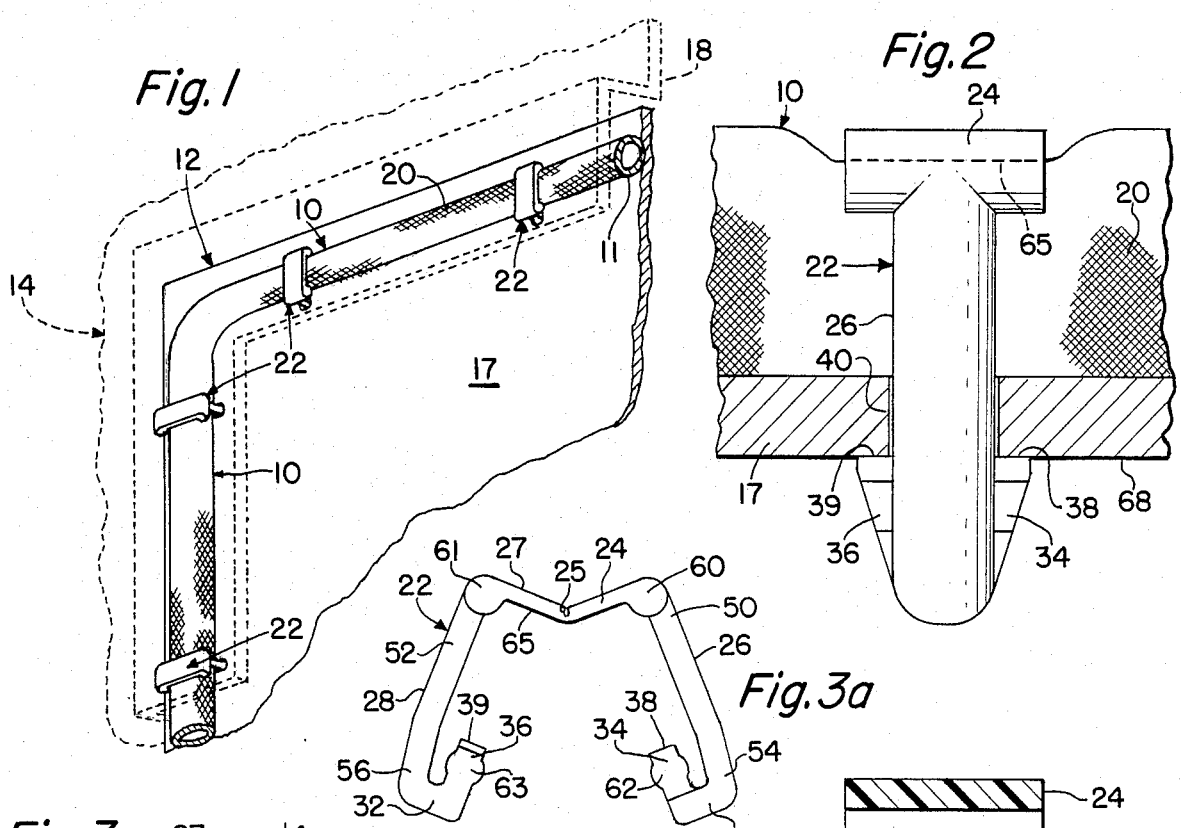
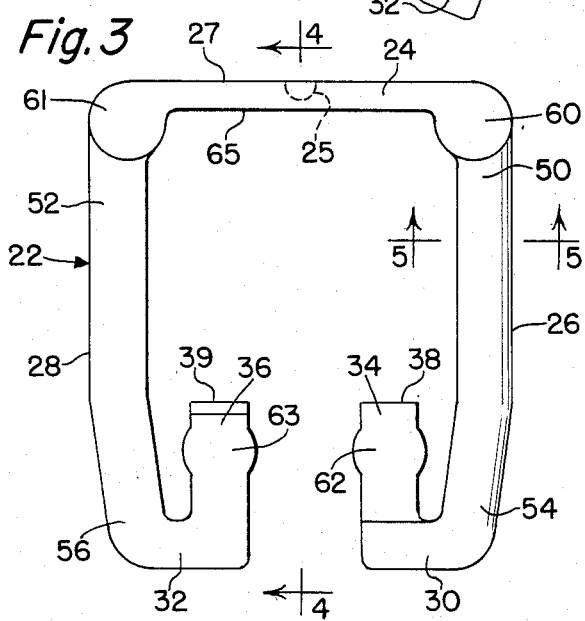
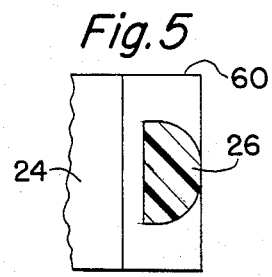
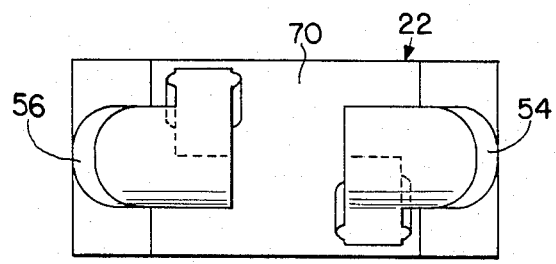
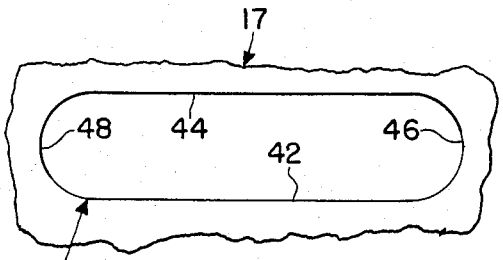

RF GASKET RETAINER CLIP

BACKGROUND OF THE INVENTION

This application is directed generally to an improved snap-in fastener for securing a gasket or the like to a panel, and in particular is directed to a snap-in fastener for holding a gasket against a panel by retention in an elongate aperture.

The snap-in fastener of this invention is particularly adaptable for mounting a tubular or sponge gasket that is commonly used to shield radio frequency waves in electronic equipment such as computers. The tubular or sponge gasket for providing such radio frequency shielding generally comprises an elastomeric strip that is encased by a thin flexible sleeve of metallic mesh. Functionally, this flexible metallic mesh shield member provides intimate, metal-to-metal contact between the mesh-like sleeve and two opposing housing surfaces upon the flexible shield member being compressed between the housing surfaces, such as between a door or panel and its abutting door frame or chassis.

One of the objectionable characteristics of current wire form fasteners is that they can cause an electrical short circuit should they dislodge and fall into the equipment. Accordingly, the snap-in fastener arrangement of this invention is designed to be non-metallic and non-conductive.

Additionally, it will be appreciated that such a fastener arrangement should preferably be relatively simple and inexpensive in its design and manufacture, and capable of being assembled simply and quickly into the preformed aperture in the panel.

SUMMARY OF THE INVENTION

This invention is directed to a one-piece, snap-in fastener of resilient deformable material for holding a deformable resilient gasket against a panel by snapping into a regular-shaped aperture formed in the panel. The snap-in fastener comprises an elongate bight portion, a pair of integral leg portions extending transversely from the ends of the bight portion, and a pair of inwardly extending feet portions integrally formed at the extremities of the leg portions. The bight portion, leg portions and feet portions are constructed to lie in a common straight plane. A pair of resilient wing portions are integrally formed at the extremities of the feet portions and diverge from opposite sides of the common plane such that when the fastener is inserted into the aperture the wing portions engage opposite sides of the elongate aperture to seat the fastener in the aperture.

DESCRIPTION OF THE DRAWING

For a better understanding of this invention reference may be made to the accompanying drawing, in which:

FIG. 1 is a simplified partial perspective view of a housing for electronic equipment such as a computer depicting a gasket fastening arrangement that employs snap-in fasteners of the type embodied in this invention;

FIG. 2 is a side elevational view of the snap-in fastener of this invention shown as installed in an aperture of a mounting plate and holding a portion of a tubular gasket therein;

FIG. 3 is a front view of the preferred embodiment of this invention;

FIG. 3a is a front view of a modification of the preferred embodiment on this invention;

FIG. 4 is a cross-sectional view of FIG. 3 taken along the lines 4—4;

FIG. 5 is a cross-sectional view of FIG. 3 taken along the lines 5—5;

FIG. 6 is a bottom plan view of FIG. 3; and

FIG. 7 is a partial top plan view of the mounting panel of FIG. 2 depicting the elongate aperture into which the snap-in fastener is to be installed.

DESCRIPTION OF THE PREFERRED EMBODIMENT

Referring now to FIG. 1, the fastener arrangement incorporating the principles of this invention will be described with reference to the application of securing a gasket 10 to a door panel 12 of a housing 14. The housing 14 may comprise a suitable metallic housing to provide EMI/RF shielding for electronic apparatus such as a computer or any electronic device whose internal components emit electromagnetic interference or radiate radio frequencies. The partial view of the housing 14 shown in FIG. 1 depicts a door panel 16 that closes against the doorframe 18.

The gasket 10 comprises an elongate and preferably tubular member 11 of rubber or similar elastomeric material. This tubular member 11 is surrounded by a tubular sleeve constructed of a metallic mesh or an expanded metal, screen-like material 20. A plurality of snap-in fasteners, which are made in accordance with the principles of this invention and generally designated by the reference numeral 22, are installed at selected intervals for securing the gasket 10 to the surface of the door panel 16.

There is shown in FIG. 3, a snap-in fastener 22 comprising a bight portion 24 having an inside length slightly larger than the diameter of the tubular gasket 20. A pair of generally parallel leg portions 26, 28 extend from the extremities of the bight portion 24 in a generally perpendicular direction therefrom. A pair of feet portions 30, 32 are integrally formed at the free end of the leg portions 26 and 28, respectively, and extend generally parallel to the bight portion 24 towards each other. The combined length of the feet portions 30 and 32 is substantially less than the length of the bight portion 24 to define an entry for receiving the tubular gasket 20 into the U-shaped region defined by the bight portion 24 and pair of legs 26 and 28.

As can be seen by referring to FIGS. 2, 4 and 6, the bight portion 24, the leg portions 26, 28 and the feet portions 30, 32 lie in a common straight plane. A pair of wing portions 34, 36 are integrally formed on the extremities of the feet portions 30 and 32, respectively. The wing portions 34 and 36 diverge from opposite sides of the common straight plane formed by the bight portions, leg portions and feet portions as clearly illustrated in FIGS. 4 and 6. The outer flat end surfaces 38 and 39, respectively, of wing portions 34 and 36 are disposed adjacent to an imaginery straight plane formed by the straight side surfaces of leg portions 26 and 28 (FIG. 2 and FIG. 4).

For reasons that will be explained hereinafter, the diverging wing portions 34 and 36 extend generally perpendicular to the bight portion 24 as clearly depicted in FIG. 3.

The fastener 22 is particularly shaped to fit in an elongate aperture, such as oval aperture 40 as illustrated in FIG. 7. A plurality of elongate oval apertures 40 is preformed in the door panel 17 at spaced intervals for receiving the fasteners 22 as depicted in FIG. 1. Each oval aperture 40 has a pair of parallel sides 42 and 44 which are joined at their ends by curved end members 46 and 48.

Leg portions 26 and 28 of snap-in fastener 22 are spaced apart a fixed distance to provide a width slightly less than the width of the elongate oval slot 40 and have curved outer side surfaces to conform to the curved ends 46 and 48 of aperture 40. As depicted in the cross-sectional view of FIG. 5, leg portion 26 has a semi-circular cross-sectional shape that conforms to the curved ends 46 and 48 of oval slot 40. The cross-section of leg portion 28 is identical to that of leg portion 26.

The inward sections 50 and 52 of leg portions 26 and 28, respectively, are spaced apart a distance which is slightly less than the length of the aperture 40 of panel 17 to provide a snug-fitting arrangement in the aperture 40. Outward sections 54 and 56 of leg portions 26 and 28, respectively, taper inwardly with respect to the bight portion 24 to provide a pair of cooperating lead-in ramp surfaces for inserting the fastener 22 into the aperture 40.

A fastener of the type described must be sturdy and yet resilient. It can be fabricated by injection molding from thermoplastic materials, such as nylon or an acetal-type resin by standard injection molding techniques. An important feature of this invention is that it can be fabricated with a simple two-plate mold without any side action. To provide an easy and quick removal from the mold, the fastener 22 is provided with four knock-out portions 60, 61, 62 and 63, which are struck by knockout pins at the end of the molding process as is well known in injection molding. These four knock-out portions 60–63 have the further advantage of strengthening the snap-in fastener 24.

The bight portion 24 of fastener 22 has a rectangular head span section 70, whose width spans across the distance extending between the wing portions 34, 36 (see FIG. 6) for the purpose of facilitating the automatic feeding and inserting fastener 22 into aperture 40.

The installation of the snap-in fasteners 22 over the tubular gasket 20 and into the aperture 51 is a simple and quick operation. The fastener 22 is pressed over the tubular gasket 20 by pressing inwardly on the feet portions 30 and 32 causing them to spread apart and enlarge the entryway between the wing members 34 and 36. The leg portions 26, 28 then straddle the gasket 20.

To greatly facilitate the installation of fastener 22 onto gasket 20, a living hinge can be formed in the middle section of bight portion 24, as depicted by the dotted semi-circle line 25 in FIG. 3. The living hinge 25 is formed by reducing the cross sectional area at the middle section of bight portion 24 inwardly of its upper surface 27. By inclusion of such a living hinge 25, it is possible to install the fastener 22 onto the gasket 20 without the necessity of spreading apart the feet portions 30 and 32, as is illustrated in FIG. 3a.

Once the fastener is installed onto the gasket 20, the fastener 24 is slid along the tubular gasket until it is in alignment with one of the elongate oval apertures 40 provided at spaced intervals along panel 17. The fastener 22 is pushed inwardly of the aperture 40 causing the lead-in ramp surfaces of the lower leg segments 54 and 56 to guide the fastener into the aperture such that the upper leg sections 50 and 52 fit directly into the oval aperture 40. When the fastener 22 is pushed inwardly of the aperture 40, the diverging wing portions 34 and 36 deflect inwardly of the sides of aperture 40 until they clear its bottom surface 68 whereupon the wing portions are free to spring outwardly and engage the bottom surface 68 of mounting plate 17.

As depicted in FIG. 2, the fastener 22 is preferably designed such that the tubular gasket 20 is slightly compressed when the fastener is in the installation position. This feature is provided by making the distance between the inside surface 65 of bight portion 24 and the two outer ends 38 and 39 of wing portions 34 and 36, respectively, to be slightly less than the combined total of the diameter of tubular gasket 20 and the thickness of panel 17.

It will be appreciated from the foregoing description that upon the door or chassis panel 12 being closed against a panel, doorframe or the like, it is likely that the tubular gasket 20 will be compressed along its entire length. Upon such further compression of the tubular gasket from that shown in FIG. 2, the fastener 22 will be forced inwardly of the aperture 40 causing the pair of wing portions 34 and 36 to move away from the bottom surface 68 of panel 17. Upon the reopening of the door 12, the gasket 20 will expand to its uncompressed condition, moving the associated fasteners 22 back to the position illustrated in FIG. 2.

One of the critical design features in constructing the fastener 22 of this invention is to form the pair of wing portions 34 and 36 to extend perpendicular to the bight portion 24. The reason that this relationship is important is that any outward pulling on the tubular gasket 20 away from aperture 40 causes a reactionary force between the wing portions 34 and 36 and the undersurface 68 of panel 17. The formation of the two wing portions perpendicular to the bight portion 24 prevents the wing portions from bending sideways since the outward pulling force on gasket 20 causes a compressive force to be exerted on the two wing portions.

While the preferred embodiment has been described for use with an elongate oval aperture it will be appreciated that the fastener would work with other elongate regular-shaped apertures as long as the cross-sectional outline of the leg portions 26 and 28 generally conform to the shape of the aperture.

I claim:

1. A one-piece snap-in fastener of resilient deformable material for holding a deformable resilient gasket against a panel by snapping into a symmetrically-shaped aperture formed in said panel, comprising an elongate bight portion, a pair of integral leg portions extending angularly from the opposite ends of said bight portion, a pair of inwardly extending feet portions integrally formed at the free end of said leg portions, said feet portions generally extending towards each other and said feet portions having a combined length less than the length of said bight portion to provide an entryway for inserting said gasket, where said bight portion, said leg portions and said feet portions lie in a common straight plane, and a pair of resilient wing portions intergrally formed at the free end of said feet portions and diverging from opposite side of said common plane, where the distance spanned by said leg portions is slightly smaller than said aperture and where said wing portions generally extend perpendicular to said aperture when said fastener is inserted into said aperture.

2. A one-piece snap-in fastener as defined in claim 1, wherein said integral leg portions have their fixed ends extend generally perpendicular from said bight portion and have their free ends taper inward toward each other to provide a lead-in ramp surface for inserting said snap-in fastener into said aperture.

3. A one-piece snap-in fastener as defined in claim 1, wherein said bight portion includes a generally rectangular cross section having a length that is larger than said distance spanned by said wing portions and includes resilient means for momentarily enlarging said entryway when installing said fastener over said gasket.

4. A one-piece snap-in fastener as defined in claim 1, wherein the distance as measured along said common plane between the outer edge of said wing portions and the inside surface of said bight portion is less than the combined total of the diameter of said tubular gasket and the thickness of said apertured panel to cause said deformable tubular gasket to be slightly compressed upon said fastener being installed into said aperture.

5. An one-piece snap-in fastener of resilient deformable material for holding a deformable resilient gasket against a panel by snapping into an oval-shaped aperture formed in said panel, said fastener comprising an elongate bight portion, a pair of integral leg portions extending perpendicular from the opposite ends of said bight portion, a pair of inwardly extending feet portions formed integrally at the free end of said leg portions, said leg portions being shaped to conform to said curved ends of said aperture and spaced apart a distance to seat snugly into said aperture, said feet portions generally extending towards each other and said feet portions having a combined length less than the length of said bight portion to provide an entryway for insertion of said gasket, where said bight portion, said leg portions and said feet portions lie in a common straight plane, and a pair of resilient wing portions integrally formed at the free end of said feet portion and diverging from opposite sides of said common plane, and where said wing portions extend generally perpendicular to said aperture when said fastener is inserted into said aperture.

6. A one-piece snap-in fastener as defined in claim 5, wherein the distance as measured along said common plane between the outer edge of said wing portions and the inside surface of said bight portion is less than the combined total of the diameter of said gasket and the thickness of said aperture panel to cause said deformable gasket to be slightly compressed upon said fastener being installed into said aperture.

7. A one-piece snap-in fastener as defined in claim 6, wherein said bight portion includes resilient means for momentarily enlarging said entryway when installing said fastener over said gasket.

8. A one-piece fastener as defined in claim 7, wherein said resilient means comprises a reduced cross-sectional dimension formed at the mid-section of said bight portion to define a living hinge.

9. A one-piece snap-in fastener as defined in claim 5, wherein said integral leg portions have their fixed ends extend generally perpendicular from said bight portion and have their free ends taper inward toward each other to provide a lead-in ramp surface for inserting said snap-in fastener into said aperture.

10. A one-piece snap-in fastener as defined in claim 5, wherein said bight portion includes a generally rectangular cross section having a length that is larger than the distance spanned by said wing portions.

* * * * *